United States Patent
Stein et al.

(10) Patent No.: US 9,910,186 B2
(45) Date of Patent: Mar. 6, 2018

(54) DYNAMIC LIGHT CURTAIN MUTING SYSTEM AND METHOD

(71) Applicant: Rockwell Automation Safety AG, Landquart (CH)

(72) Inventors: Manfred Stein, Domat/Ems (CH); Eric Matthew Lutz, Vilters (CH)

(73) Assignee: Rockwell Automation Safety AG, Landquart (CH)

( * ) Notice: Subject to any disclaimer, the term of this patent is extended or adjusted under 35 U.S.C. 154(b) by 206 days.

(21) Appl. No.: 14/828,074

(22) Filed: Aug. 17, 2015

(65) Prior Publication Data

US 2017/0052278 A1    Feb. 23, 2017

(51) Int. Cl.
*G01V 8/20* (2006.01)
*F16P 3/14* (2006.01)

(52) U.S. Cl.
CPC ............... *G01V 8/20* (2013.01); *F16P 3/144* (2013.01)

(58) Field of Classification Search
CPC ..... G01V 8/20; H01J 40/14; F16P 3/14; F16P 3/144
USPC .......................................... 250/221; 340/556
See application file for complete search history.

(56) References Cited

U.S. PATENT DOCUMENTS

| | | | | |
|---|---|---|---|---|
| 5,243,183 A * | 9/1993 | Barron, Jr. | ............. | F16P 3/144 250/221 |
| 6,218,940 B1 * | 4/2001 | Rejc | ........... | E06B 9/82 250/221 |
| 6,979,814 B2 | 12/2005 | Kudo et al. | | |
| 7,767,954 B2 * | 8/2010 | Pirkl | ...................... | F16P 3/144 250/221 |
| 8,330,095 B2 | 12/2012 | Kawabata | | |
| 8,339,260 B2 | 12/2012 | Krieger et al. | | |
| 8,446,247 B2 * | 5/2013 | Allen | ...................... | G01V 8/20 340/3.1 |
| 2010/0194583 A1 | 8/2010 | Kawabata | | |

FOREIGN PATENT DOCUMENTS

| | | |
|---|---|---|
| DE | 10304054 | 8/2004 |
| DE | 10329881 | 1/2005 |
| DE | 102004038906 | 3/2006 |

(Continued)

OTHER PUBLICATIONS

European Search Report for European Patent Application No. 16182179.8-1559 dated Jan. 9, 2017, 13 pages.

*Primary Examiner* — Seung C Sohn
(74) *Attorney, Agent, or Firm* — Amin, Turocy & Watson, LLP

(57) ABSTRACT

A light curtain system is configured to perform dynamic partial muting of the light curtain's beams to accommodate products of different heights. When a product enters the light curtain's protective field during muting mode, the system identifies the highest interrupted light beam, which is indicative of the product's height. The system then sets the muting height for the light curtain based on this highest interrupted beam. Beams higher than the set muting height are unmuted, while beams up to the set muting height remain muted. Both regions are actively monitored during the partial muting mode to confirm the expected non-interrupted, respectively interrupted conditions. When the product clears the light curtain, the muting height is reset, and a new muting height is set in a similar fashion when the next part enters the light curtain's protective field.

20 Claims, 13 Drawing Sheets

(56) References Cited

FOREIGN PATENT DOCUMENTS

| | | |
|---|---|---|
| DE | 10227710 | 4/2006 |
| DE | 10039142 | 12/2006 |
| DE | 202009000871 | 6/2009 |
| DE | 102008004941 | 10/2009 |
| DE | 102007033766 | 11/2009 |
| DE | 102005030829 | 12/2009 |
| DE | 102009031226 | 1/2011 |
| DE | 102009048111 | 4/2011 |
| DE | 102012102067 | 9/2013 |
| EP | 1331433 A2 | 7/2003 |
| EP | 1873442 | 3/2009 |
| EP | 2108879 | 10/2011 |
| EP | 2933662 A1 | 10/2015 |
| JP | 4485757 | 6/2010 |

\* cited by examiner

DYNAMIC LIGHT CURTAIN MUTING SYSTEM AND METHOD

BACKGROUND

The subject matter disclosed herein relates generally to industrial safety light curtains, and, for example, to techniques for dynamically setting a partial muting height to accommodate products of different heights.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a light curtain control system is provided, comprising a light curtain status component configure to generate status information for a light curtain based on a determination of whether one or more light beams, of a set of light beams emitted by a set of emitters of the light curtain, are detected by corresponding one or more receivers of the light curtain; a muting control component configured to control a partial muting mode for the light curtain; and a muting height configuration component configured to set a muting height for the partial muting mode based on identification of a highest light beam, of the set of light beams, that is interrupted by an object detected by the light curtain during the partial muting mode.

A method for partially muting a light curtain is also described, wherein the method comprises initiating, by a system comprising a processor, a muting mode for a light curtain, wherein the muting mode causes all light beams of the light curtain to become muted; determining, by the system, that at least one of the light beams has been interrupted during the muting mode; identifying, by the system and after a defined time period has elapsed after the determining, a highest interrupted light beam of the light beams; and initiating, by the system, a partial muting mode for the light curtain in response to the identifying, wherein the initiating the partial muting comprises setting a muting height for the partial muting mode based on the highest interrupted light beam.

Also, in one or more embodiments, a non-transitory computer-readable medium is provided having stored thereon instructions that, in response to execution, cause a system to perform operations, the operations comprising detecting that a light curtain has initiated a muting mode; muting all light beams of the light curtain in response to the detecting; in response to determining that at least one of the light beams has been interrupted during the muting mode, identifying a highest interrupted light beam of the light beams; initiating a partial muting mode in response to identifying the highest interrupted light beam; and setting a muting height for the partial muting mode based on the highest interrupted light beam.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
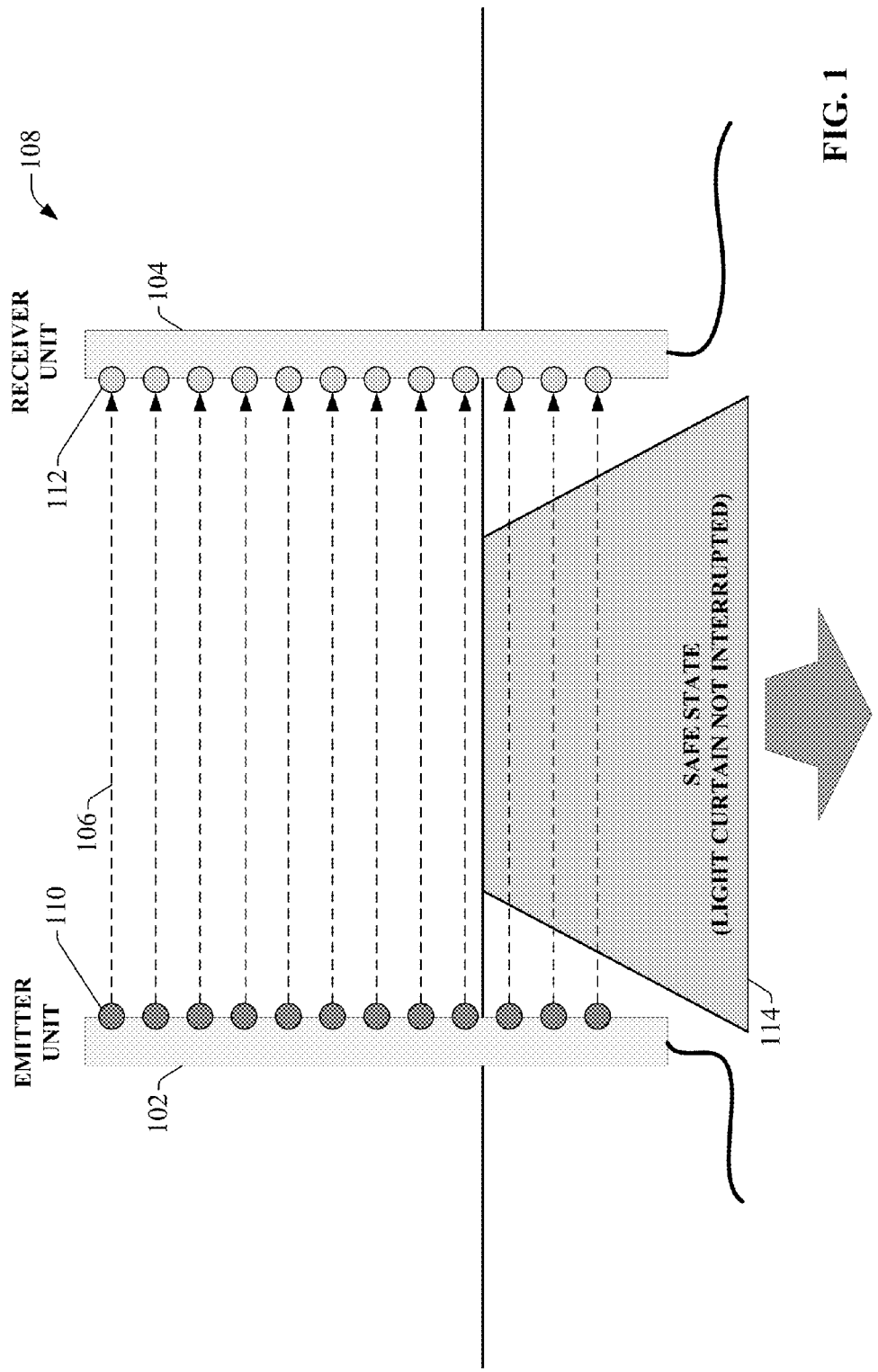
FIG. 1 is a diagram illustrating operation of an example light curtain mounted across a conveyor.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Many industrial automation systems incorporate light curtains to detect the presence of objects or people at certain locations around a controlled process or machine. These light curtains are typically integrated with the control and safety systems of industrial machinery to cause power to be removed from hazardous machinery near the location of the light curtain when objects are detected, thereby acting as safety devices for industrial automation systems. FIG. 1 is a diagram illustrating operation of an example light curtain 108 mounted across a conveyor 114. Light curtains typically comprise an emitter unit 102 and a receiver unit 104. Emitter unit 102 comprises an array of emitter elements 110 mounted in series on a bar structure. Each of the emitter elements 110 is configured to emit a modulated light beam 106 toward a corresponding receiver element 112 of the receiver unit 104. Each receiver element 112 is configured to detect presence or absence of the light beam emitted by its corresponding emitter element 110. The emitted beams 106 are collectively referred to herein as the light curtain's protective field.

Figure 2:
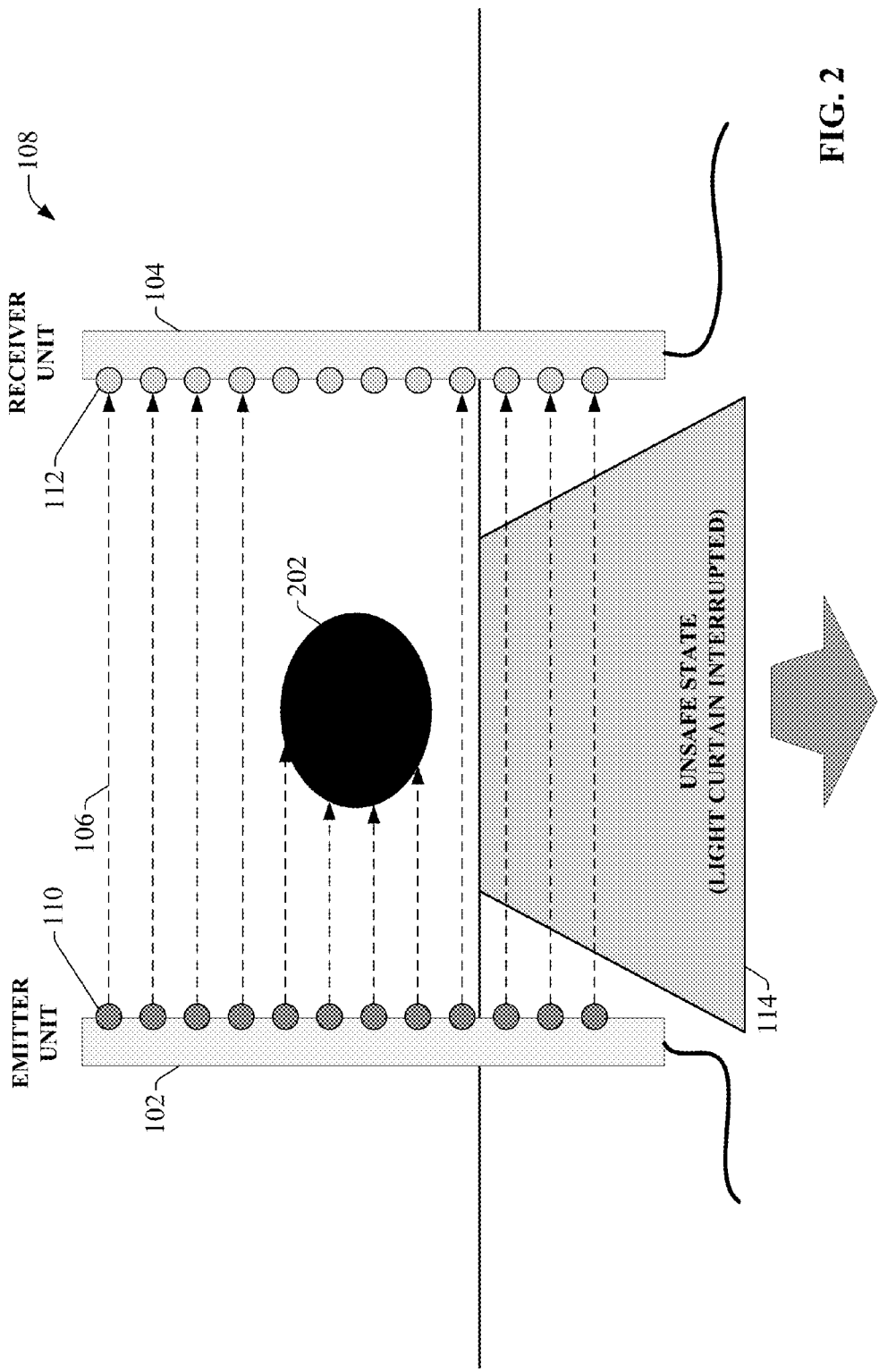
FIG. 2 is a diagram illustrating detection of an object by a light curtain mounted across a conveyor.

During normal operation, the light curtain's controller is configured to generate an output signal indicating a safe state as long as each receiver element 112 detects its corresponding light beam. As long as all light beams are detected by their associated receiver elements, it is assumed that no objects are located between the emitter and receiver units. FIG. 2 is a diagram illustrating detection of an object 202 by light curtain 108. When object 202 (e.g., a human appendage or other obstruction) passes between emitter unit 102 and receiver unit 104 during normal light curtain operation, the object 202 blocks one or more of the emitted light beams, preventing the corresponding receiver elements 112 from receiving the beams. Upon detecting the loss of one or more beams at any of the receiver elements, the light curtain's controller changes the state of its output signal to indicate an unsafe state. Depending on the particular industrial application in which the light curtain is being used, the unsafe state output will cause the relevant portion of the industrial system to switch to a safe mode to prevent possible injury or equipment damage. For example, the change in the light curtain's output signal can cause the safety system to remove power from the hazardous machinery, stopping all machine movement upon detection of the beam blockage.

In the example depicted in FIGS. 1 and 2, the light curtain is mounted across a conveyor 114 that feeds packaged products (e.g., boxes or stacks of boxes loaded on a pallet) to a protected workcell. The workcell may comprise, for example, a gated area containing an industrial robot or other machine that performs an operation on the products (e.g., wrapping the products, stacking the products, sorting the products, etc.). In such applications, the open entryway through which conveyor passes the product is a potential hazard point, since it is possible for a human operator to enter the hazardous area through the product entryway, or to reach into the hazardous area through the product entryway. Accordingly, the light curtain 108 is mounted across the conveyor 114 such that the beams 106 cover the open product entryway. The light curtain's outputs signal can be tied to the workcell's safety system such that, when the beams 106 are interrupted during normal operation—indicating that a human operator may have breached the product entryway—the light curtain's controller initiates safe mode for the workcell. If the light curtain detects this unsafe state while the industrial system is running, the unsafe state output will cause the safety system to isolate power from selected devices or machines within the workcell, causing the system to stop running and removing the hazard.

Figure 3:
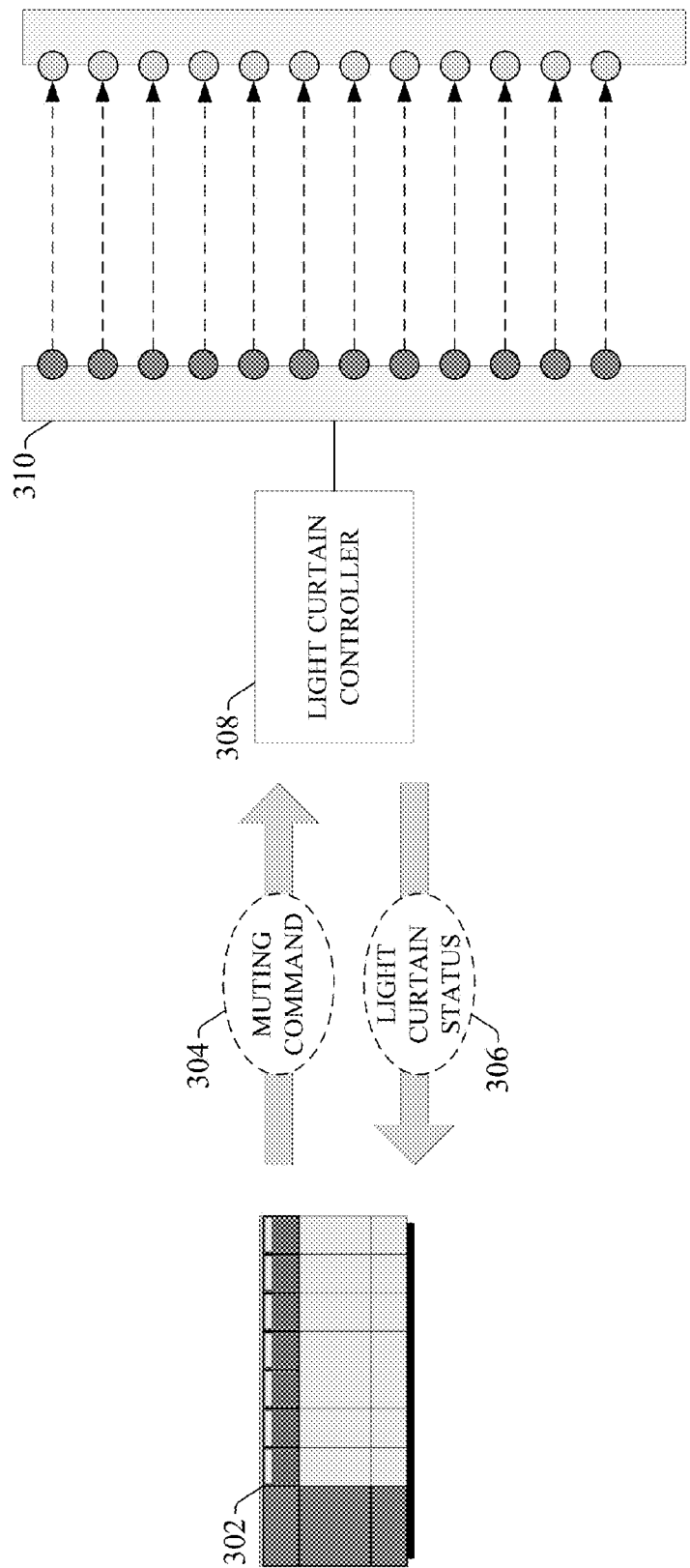
FIG. 3 is a diagram illustrating an example data exchange between an industrial controller and a light curtain controller.

To allow products to pass through the entryway (and thus through the light curtain) without shutting down the automation system within the workcell, the light curtain supports a muting mode whereby monitoring of the light curtain's beams is temporarily suspended during certain phases of system operation during which products are expected to pass through the entryway into the workcell. In some configurations, instructions to switch the light curtain to muting mode are issued by the industrial controller that controls the product conveyor system feeding the palletized products into the workcell. FIG. 3 is a diagram illustrating an example data exchange between an industrial controller 302 and a light curtain controller 308. Industrial controller 302 (e.g., a programmable logic controller or other type of programmable automation controller) controls the conveyor 114 and related machinery and devices that facilitate transportation of products into the protected workcell. The I/O modules installed on the industrial controller 302 exchange information with input and output devices (not shown) that comprise the product conveyance system. Input devices can include, but are not limited to, photo sensors or other part detection input devices, safety mats, control panel push buttons and switches, motor drives (which may provide conveyor status and speed information), or other such devices. Output devices can include, but are not limited to, motor drives that control movement of the conveyor 114, indicator lights, pneumatic or hydraulic actuators (e.g., part pushers, elevating platforms, etc.), relays that serve as interlocks to other devices or machines, or other such output devices. The industrial controller 302 controls the conveyor system in accordance with a control program (e.g., ladder logic, sequential function chart, etc.) defining the control sequence for feeding products into the workcell. In particular, the industrial controller 302 controls the output signals to the various output devices comprising the conveyor system based on the control program and the values of the various input devices, which provide system status information to the controller.

In this example, some of the industrial controller's I/O is interfaced with a light curtain controller 308, which controls operation of light curtain 310 mounted across the product entryway of the workcell. The light curtain controller 308 can include hardwired input and output terminals that are electrically coupled to selected input and output modules of industrial controller 302 (either directly or via relays) to facilitate exchange of signals between the two controllers. Alternatively, light curtain controller 308 can exchange data across a network connection (e.g., Ethernet, EthernetIP, ControlNet, DeviceNet, etc.).

Light curtain controller 308 provides a light curtain status 306 to the industrial controller 302, indicating when the light curtain's beams are interrupted (indicating an unsafe state) and when the beams are uninterrupted (indicating a safe state). To prevent normal product conveyance through the light curtain 310 from halting the system, industrial controller 302 sends a muting command 304 to the light curtain controller 308 during times when a product (or pallet of products) is expected to pass through the workcell entryway. The timing of the muting command output is controlled by the control program executed by the industrial controller 302, based on the defined control sequence and any relevant input data read from input devices (e.g., photo sensors, etc.) that may indicate that a pallet is about to pass through the entryway. For example, the statuses of certain input devices monitored by the industrial controller 302 can indicate to the control program which phase of the control sequence is currently active. When the current control sequence corresponds to a time at which a product or pallet is expected to pass through the light curtain 310, the industrial controller 302 will output the muting command 304 to the light curtain controller 308. While the muting command is active, the light curtain controller 308 will not output a command to switch the workcell to safe mode even if the light curtain's beams are interrupted. This allows the product or pallet to pass through the light curtain without halting the automation system running inside the workcell. When the industrial controller 302 determines that the product has passed through the light curtain (e.g., based on the statuses of relevant input devices that monitor progress of the pallet), the industrial controller 302 will turn off the muting command 304, and the light curtain controller 308 will again operate in normal (non-muting) mode whereby breaking the light curtain's beams will cause the light curtain controller 308 to output the safe mode command (causing the workcell's safety system to isolate power from the automation system).

Although FIG. 3 depicts the muting command as being issued by an industrial controller, in some scenarios the light curtain controller 308 can autonomously determine when the light curtain 310 is to be muted independently of an industrial controller. For example, the light curtain controller 308 may be interfaced with a number of part presence sensors (e.g., photo sensors, proximity sensors, or other types of sensors) and programmed to infer when a valid product is approaching the light curtain 310 based on a recognizable sequencing of the sensor inputs.

Figure 4:
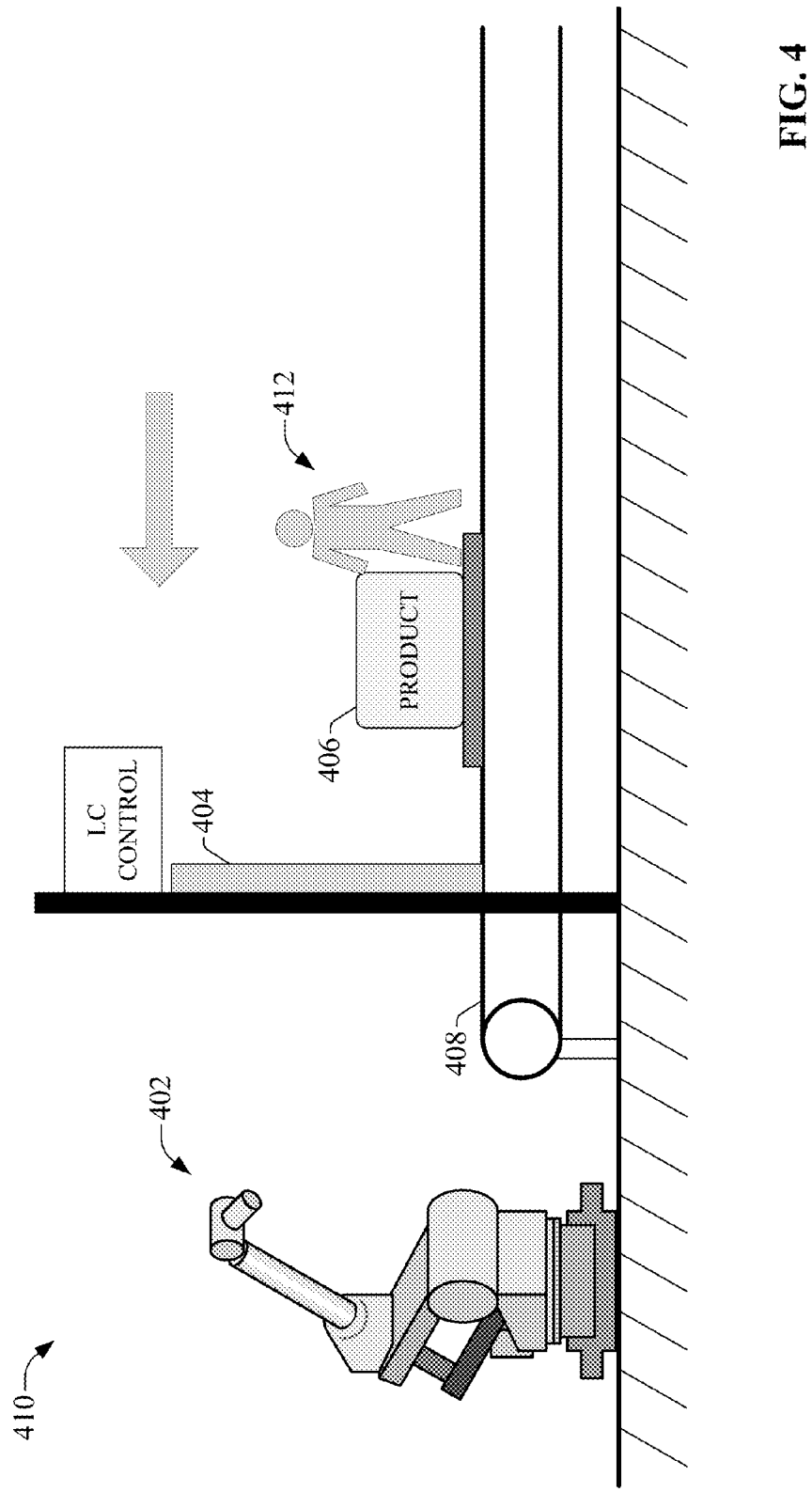
FIG. 4 is a diagram illustrating an example scenario in which an operator may pass through the product entryway of a workcell while a light curtain is muted.

While the light curtain is muted, there is a risk that an operator may pass through the entryway as the product is passing through the light curtain's muted protective field, allowing the user to enter the workcell without causing the safety system to switch to safe mode. FIG. 4 is a diagram illustrating an example scenario in which an operator may pass through the product entryway of a workcell while a light curtain is muted. In this example, conveyor 408 is conveying a pallet of products 406 through the entryway of a workcell 410 in which a robot 402 is active. When the pallet of products 406 is about to pass through the entryway (e.g., as determined by the industrial controller, by sensors configured to detect the presence of the product at the entryway, or by other means), the light curtain 404 mounted across the entryway (shown in profile in FIG. 4) is muted to allow the pallet to pass without halting the robot 402. Because the light curtain 404 is muted while the pallet traverses through the light curtain, an operator standing or sitting on the pallet (or walking along side the pallet) would be allowed to pass through the light curtain's beams without causing the robot's safety system to switch to safe mode. This puts the operator at risk of injury from the active robot.

To prevent operators from entering the workcell in this manner, a mechanical guard (e.g., a plate, fence, or other type of guarding) could be installed across the entryway at a height that allows palletized products to pass under the guard, while physically blocking operators from entering on top of the pallets. However, if products of different heights will be passing into the workcell, the height of the guard would have to be adjusted each time a product of a different height is to pass through the entryway.

According to another possible solution, the light curtain could be configured to support partial muting, whereby only selected beams of the light curtain—the beams that are expected to be interrupted by the palletized product, roughly corresponding to the height of the palletized product—are muted during muting mode, while the beams above the highest muted beam remain active. However, as with the physical guard solution, impracticalities of the partial muting solution become apparent when products of different heights are used. For example, height of the partial muting (that is, the number of lower-most beams that should be muted) would have to be reconfigured for each different product height to ensure that the product can pass through the light curtain without triggering safe mode while at the same time ensuring that an operator riding on top of the pallet will interrupt at least one un-muted beam. Even if the light curtain supports pre-configuration of different muting heights, it would be necessary for the industrial controller to inform the light curtain controller which pre-configured muting height to use each time the light curtain is to be muted. This would necessitate installation of additional I/O devices and creation of additional control programming in the industrial controller to determine (a) that an object about to pass through the entryway is a legitimate palletized product and not an operator, and (b) an identity of the palletized product so that the light curtain can select the correct pre-defined muting height. The additional devices and programming necessary to make these determinations adds complexity to the control system and can be susceptible to identification errors, which increase the risk of injury.

According to yet another possible solution, the system designer can configure a partial muting mode in which the only a selected number of the lower-most beams are muted when the muting mode is active, while the remaining upper-most beams continue to be monitored. This would allow products to pass through the lower-most muted beams, while the highest beams continue to monitor for the presence of objects taller than the product that may attempt to pass through the light curtain during muting mode. For such partial muting configurations, the highest muted beam would have to be set to exceed the height of the tallest expected product height in order to allow the products to pass without interrupting one of the higher un-muted beams. However, if products of different sizes are expected to pass through the light curtain, there is a higher risk of an operator subverting the system when smaller products are passing through the light curtain. This is because the highest muted beam is fixed, and consequently there is a larger clearance between the top of the product and the highest muted beam when smaller products are passing through the light curtain, allowing for the possibility of an operator passing through this clearance without being detected by the light curtain.

To address these and other issues, one or more embodiments described herein relate to a light curtain system that can perform dynamic partial muting without pre-configuration of different pre-set product heights and without the need for the industrial controller to identify the product prior to muting. The dynamic partial muting features are suitable for products or palletized products that have a substantially uniform height along their length (e.g. boxes or stacks of boxes loaded on a pallet). According to one or more embodiments, when an object initially enters the light curtain's protective field while the light curtain is muted, the highest interrupted beam is identified and saved to memory. This highest interrupted beam is indicative of the product's height. Once the highest beam is identified, this highest beam and all beams below this beam remain muted, as are a small number of beams above the highest beam in order to introduce a reasonable tolerance. Beams above this muted portion are then un-muted and actively monitored while the light curtain is in partial muting mode, such that the light curtain will trigger safe mode during partial muting only when one or more of these higher beams are interrupted or when one or more of the lower muted beams become uninterrupted. When all light curtain beams are cleared and the muting condition has stopped, the light curtain returns to normal safe mode. When the next object enters the muted light curtain's protective field during muting mode, its highest interrupted beam will be identified in a similar fashion as described above. Thus, the muting height for the partial muting mode is dynamically configured by the light curtain controller itself based on the detected height of the product, without requiring a product identification signal from the industrial controller and without requiring a user to pre-configure the muting heights to be used for different products.

Figure 5:
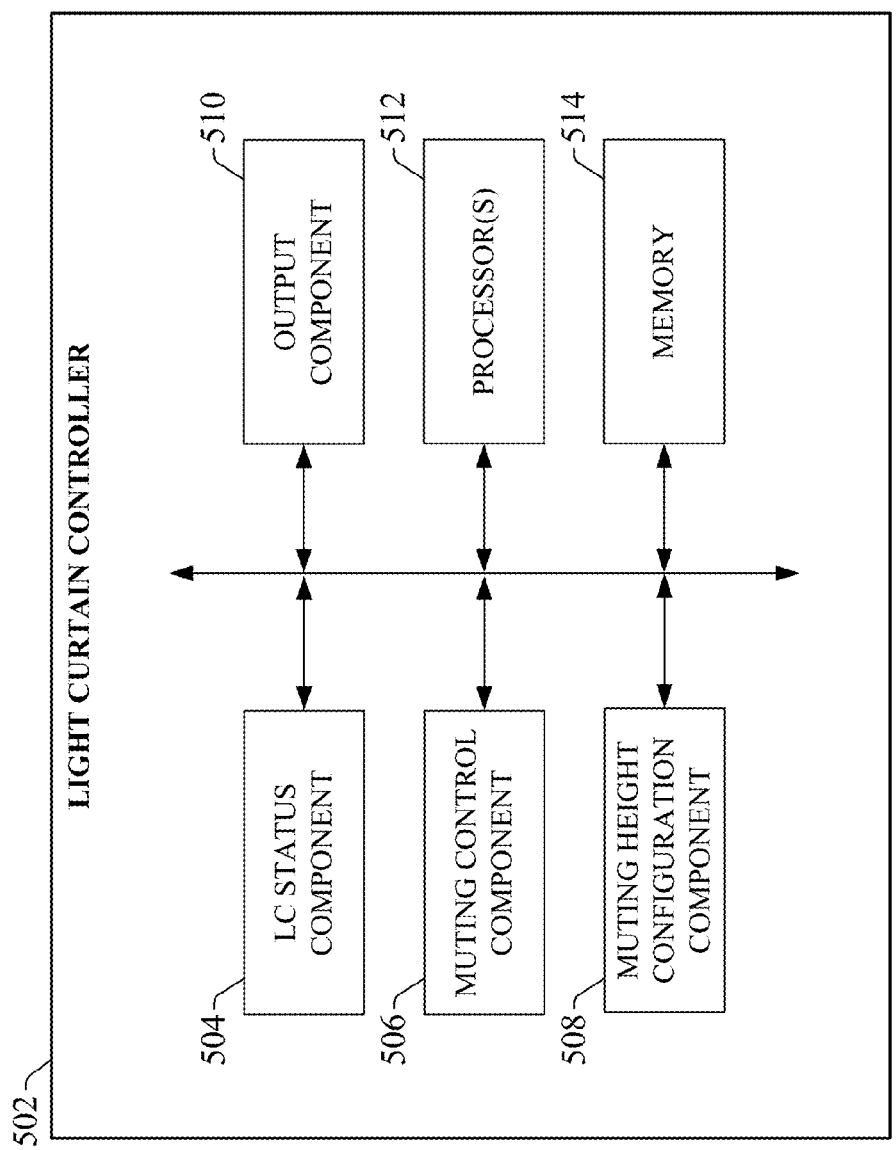
FIG. 5 is a block diagram of an example light curtain controller that supports dynamic partial muting.

FIG. 5 is a block diagram of an example light curtain controller 502 that supports dynamic partial muting according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Light curtain controller can include a light curtain (LC) status component 504, a muting control component 506, a muting height configuration component 508, an output component 510, one or more processors 512, and memory 514. In various embodiments, one or more of the light curtain status component 504, muting control component 506, muting height configuration component 508, output component 510, the one or more processors 512, and memory 514 can be electrically and/or communicatively coupled to one another to perform one or more of the functions of the light curtain controller 502. In some embodiments, one or more of components 504, 506, 508, and 510 can comprise software instructions stored on memory 514 and executed by processor(s) 512. Light curtain controller 502 may also interact with other hardware and/or software components not depicted in FIG. 5. For example, processor(s) 512 may interact with one or more external user interface devices, such as a keyboard, a mouse, a display monitor, a touchscreen, or other such interface devices. The light curtain controller 502 can also include I/O interfacing that allows the controller to interact with industrial sensors (e.g., photo sensors or other types of sensors). Moreover, the light curtain controller 502 may include LED indicators or other types of indicators to convey state information to a user.

LC status component 504 can be configured to generate status information for the light curtain controlled by the light curtain controller 502. For example, the LC status component 504 can output a signal indicating whether any of the beams of the light curtain are interrupted by an object, or alternatively whether the all beams are uninterrupted. Muting control component 506 can be configured to control the muting mode for the light curtain based on receipt of muting instructions from an industrial controller. The muting control component 506 can also control partial muting of the light curtain, including determining a muting height (representing the number of lower-most beams that are to be muted during a given muting sequence) for the partial muting mode. The muting height configuration component 508 can be configured to identify the highest interrupted beam when an object enters the light curtain's protective field during muting mode. This information is used by the muting control component 506 to configure the partial muting mode for the current muting sequence.

The output component 510 can be configured to control an output signal based on various statuses of the light curtain (e.g., whether the light curtain is operating in muting mode, the muting height configured by the muting control component 506, and determination of which beams are currently interrupted). In some embodiments, output component 510 may be configured to control a relay based on the current operating status of the light curtain and the statuses of the light curtain's beams, where the relay passes a safety signal to a separate safety system designed to isolate power to selected devices of an automation system based on presence or absence of the safety signal. In an example configuration, the output component 510 may be configured to keep the relay closed while the light curtain detects a safe state, allowing the safety signal to be seen by the safety system. When the light curtain controller 502 identifies an unsafe state based on interruption of one or more beams and the current operating mode of the controller (e.g., normal, muting, or partial muting), the output component 510 can open the relay, causing the safety signal to be removed from the safety system and indicating the unsafe state. In other embodiments, the output component 510 can be configured to generate an electrical signal when the unsafe state is detected, providing a positive confirmation of the unsafe state.

The one or more processors 512 can perform one or more of the functions described herein with reference to the systems and/or methods disclosed. Memory 514 can be a computer-readable storage medium storing computer-executable instructions and/or information for performing the functions described herein with reference to the systems and/or methods disclosed.

Figure 6:
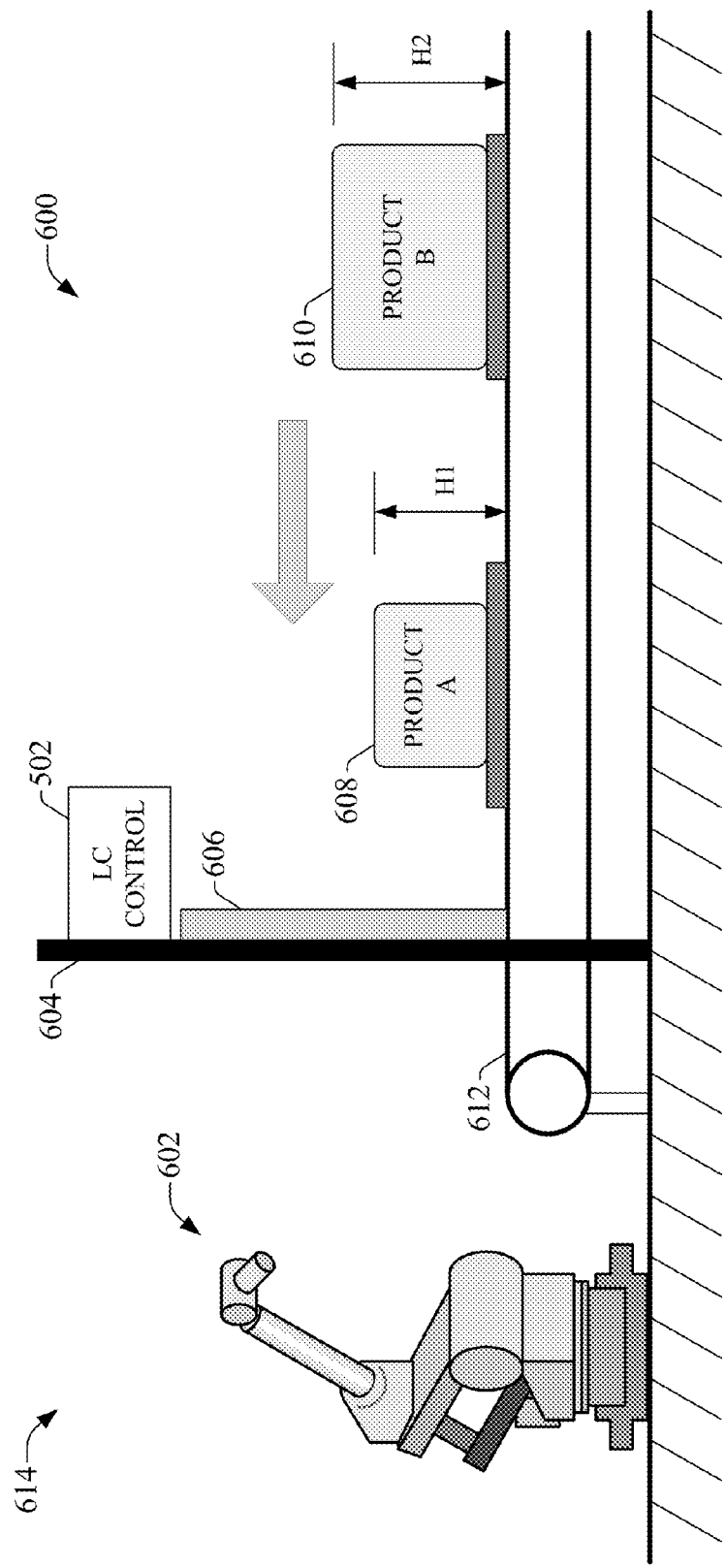
FIG. 6 is a diagram of an example conveyor system designed to transport palletized products into a protected workcell for handling by an industrial robot.

FIG. 6 is a diagram of an example conveyor system 600 designed to transport palletized products into a protected workcell 614 for handling by an industrial robot 602. Although the light curtain controller is described herein in connection with a workcell in which an industrial robot handles palletized products, it is to be appreciated that the light curtain controller is not limited to use in such applications. Workcell 614 is protected by a safety fence 604 or other protective wall to prevent operators for entering the workcell while the robot 602 is operating (the safety fence will typically include a safety gate through which operators may enter the workcell; however, such safety gates often include safety gate switches tied to the workcell's safety circuit that cause power to be isolated from the industrial robot 602 when the gate is opened).

As described in previous examples, a conveyor 612 under the control of an industrial controller (not shown) conveys palletized products (e.g., products 608 and 610) through an open entryway in the safety fence so that the products can be processed by the industrial robot 602. A light curtain 606 (shown in profile in FIG. 6) is mounted across the entryway to detect when an operator attempts to enter or reach through the entryway and to output a safety signal to the workcell's safety circuit when such a breach is detected. Light curtain controller 502 controls operation of the light curtain 606. In some configurations, light curtain controller 502 interfaces (via hardwired I/O connections or over a network connection) with the industrial controller that monitors and controls operation of the conveyor system 600. In such configurations, the industrial controller can inform the light curtain controller 502 when the light curtain 606 is to be placed in muting mode so that a product pallet can pass through the entryway (and the light curtain's protective field) without triggering safe mode and isolating power from the robot 602. In other configurations, the light curtain controller 502 can determine when the light curtain should transition to muting mode independently of the industrial controller; e.g., based on information received from sensor inputs and internal logic functions of the light curtain controller.

Figure 7:
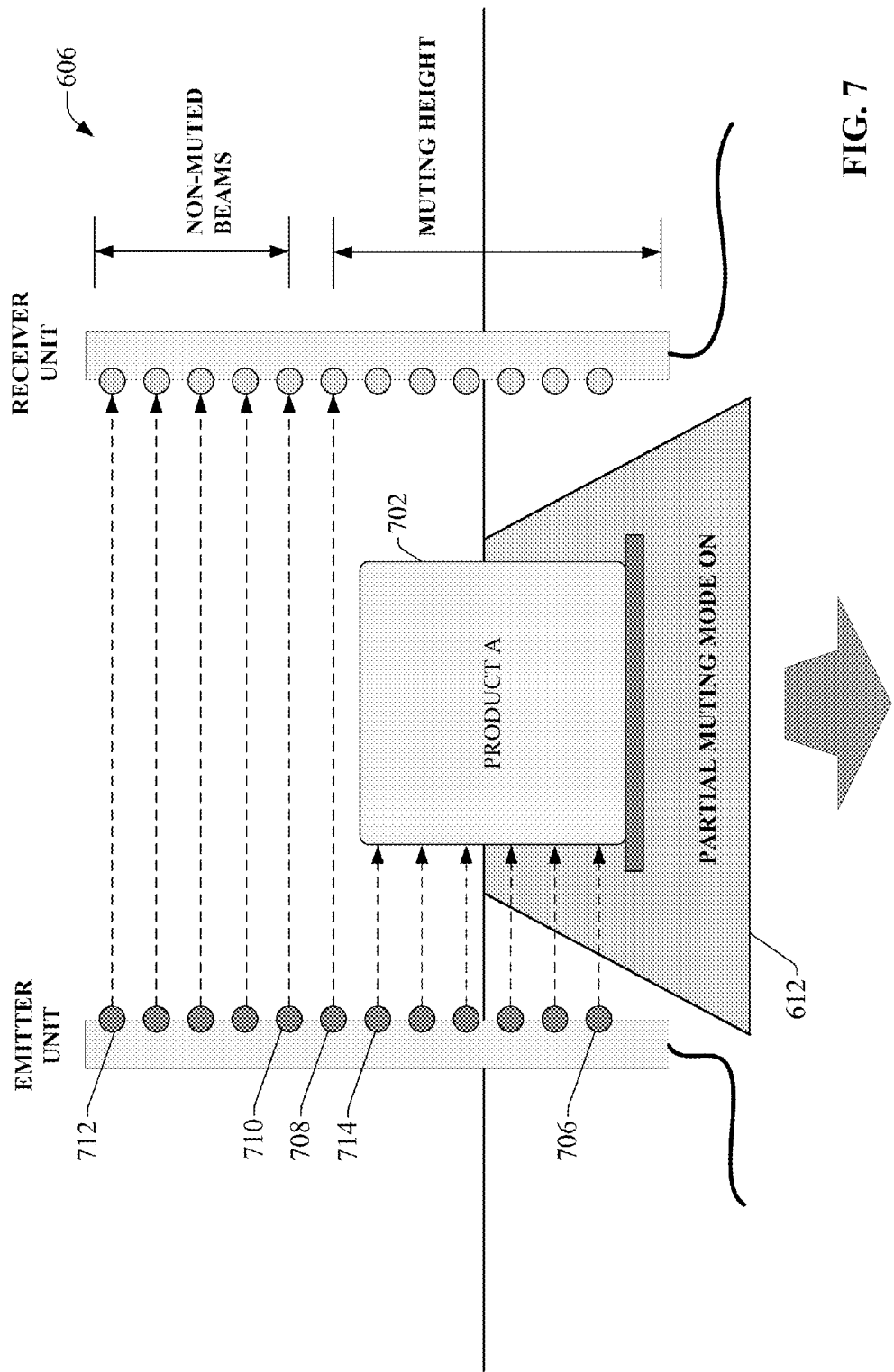
FIG. 7 is a front view of a light curtain as a palletized product is passing through the light curtain's protective field.

To prevent human operators from entering the workcell while the light curtain 606 is muted (e.g., as in the scenario illustrated in FIG. 4), light curtain controller 502 supports partial muting of the light curtain 606, which causes only a selected portion of the light curtain's protective field (that is, a selected subset of the light curtain's beam emitter/receiver pairs) to be muted during muting mode. FIG. 7 is a front view of the light curtain 606 as a palletized product 702 is passing through the light curtain's protective field. Just prior to the product 702 breaking the light curtain's protective field, the light curtain controller 502 will receive (or generate) a command to place the complete light curtain 606 in muting mode in order to allow the product to pass through the field without causing the workcell to be placed in safe mode. When this muting command is initially received, the light curtain controller will place the light curtain in full muting mode, whereby all the beams of the light curtain are muted. When the light curtain controller detects the next object to interrupt the light curtain after the light curtain has entered full muting mode, the light curtain controller will identify the highest beam (in this case, beam 714) interrupted by that object. Once this highest interrupted beam is identified, the light curtain controller places the light curtain in a partial muting mode based on this highest interrupted beam. Thereafter, for the duration of the passage of the object through the light curtain's protective field, only the beams ranging from the lower-most beam 706 to a beam 708 (slightly higher than a height of the palletized product 702) will be muted, while the remaining beams above the highest muted beam (that is, the beams ranging from beam 710 to beam 712) will remain active during the muting mode. Thus, operators riding on the top of the palletized product 702 (or walking along side the palletized product) are ensured to interrupt one of the non-muted beams ranging from beam 710 to beam 712, causing the light curtain controller 502 to initiate the workcell's safe mode. The range of lower-most beams that are muted during a given muting operation is referred to herein as the muting height.

As illustrated in FIG. 6, conveyor system 600 is designed to transport palletized products of different heights into the workcell 614. For example, Product A 608 may have a first height H1, while Product B 610 may have a taller second height H2. To ensure that products of all heights are allowed to pass through the light curtain during muting mode without compromising safety, the light curtain controller 502 can dynamically set the muting height of the curtain based on a detected height of the product when the product enters the light curtain's protective field. The light curtain controller 502 achieves this by first entering full muting mode upon receipt (or generation) of a muting command. Then, after identifying the highest interrupted beam when the palletized product initially enters the light curtain's protective field during this full muting mode, the light curtain controller 502 sets the muting height based on this determination and initiates partial muting mode based on this highest interrupted beam. Since each product or product stack expected to pass into the workcell 614 has a substantially uniform height (e.g., as in the case where the palletized products comprise boxes or stacks of boxes, or when the products themselves are box shaped), the muting height can be set to a fixed height for each product at the beginning of the product's traversal through the light curtain, and this muting height can be maintained until the product passes through the light curtain's protective field.

Figure 8:
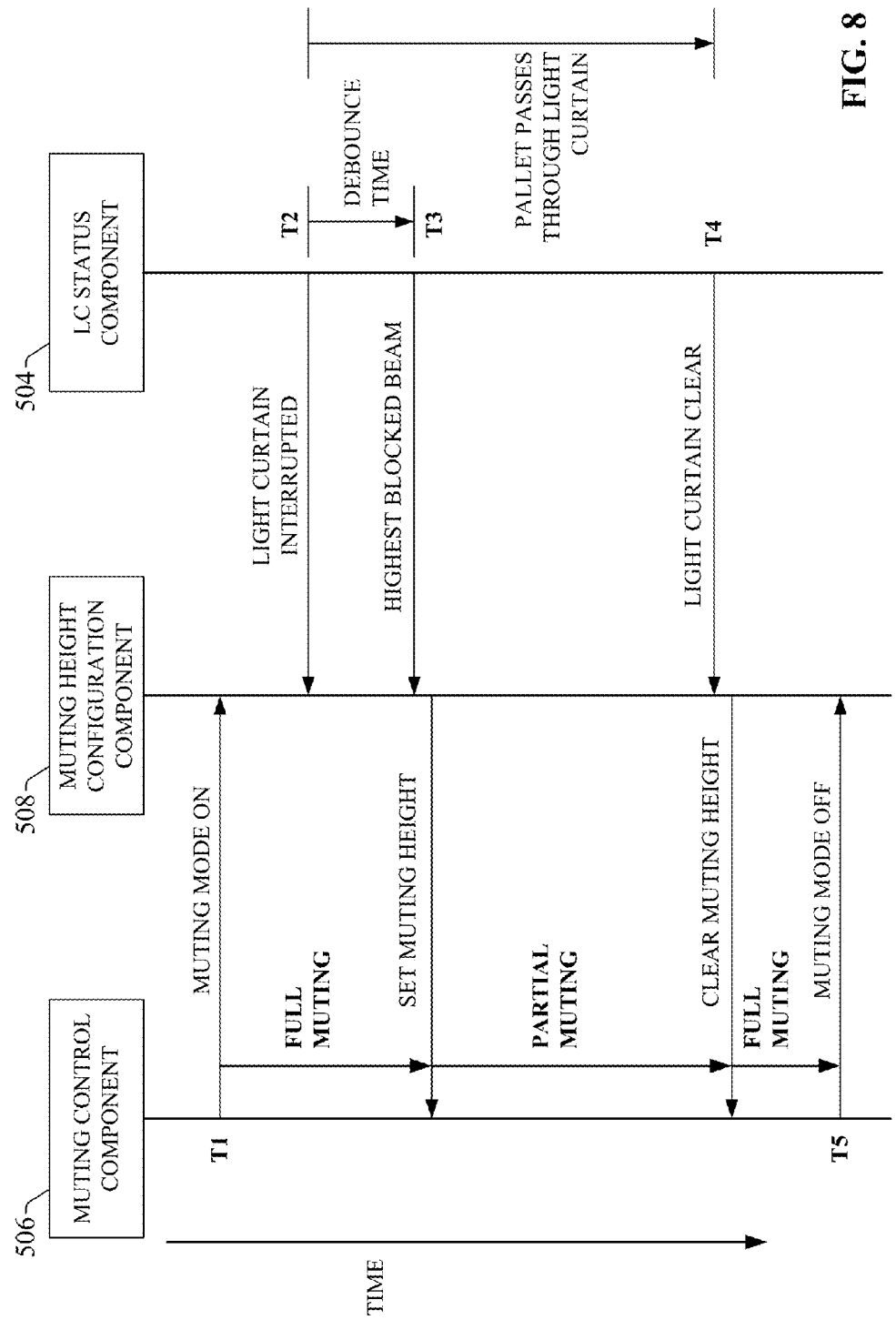
FIG. 8 is a timing chart illustrating an example sequence carried out by components of the light curtain controller to dynamically set the muting height of light curtain.

FIG. 8 is a timing chart illustrating an example sequence carried out by components of the light curtain controller to dynamically set the muting height of light curtain 606. Prior to time T1 the light curtain is operating in normal (non-muted) mode, during which all of the light curtain's beams are un-muted. During normal mode, interruption of any of the light curtain's beams will cause the light curtain controller's output component 510 to send a signal causing the workcell's safety circuit to remove power from one or more workcell machines (safe mode). This signal may comprise an active electronic signal to a safety controller, or may involve opening a safety relay that removes a safety confirmation signal monitored by the safety circuit.

At time T1, muting control component 506 sends a signal to muting height configuration component 508 informing that muting mode is now ON. In some embodiments, muting control component 506 may send this signal in response to receiving an instruction from an industrial controller (e.g., the industrial controller that controls operation of the conveyor system) to place the light curtain in muting mode. Alternatively, the muting control component 506 may be configured to initiate muting mode independently of an industrial controller based on received sensor inputs and internal muting logic. During normal operation, the muting control component 506 will place the light curtain in full muting mode just prior to a palletized product entering the protective field of the light curtain, while the light beams are still uninterrupted. During full muting mode, immediately after receipt of the muting command, all of the light curtain's beams will be muted.

At time T2, a palletized product is moved into the protective field of the light curtain by the conveyor, causing a number of the light curtain's beams to be interrupted (that is, blocking some of the light curtain's emitted beams from their respective receiver elements). At this time, the light curtain status component 504 detects that the light curtain's protective field has been interrupted by an object and sends a status indication to the muting height configuration component 508 that the light curtain has been interrupted.

At time T3, after a brief debounce time to prevent premature and possibly inaccurate height measurements, the muting height configuration component 508 determines the highest blocked emitter identified by the light curtain status component. Returning briefly to FIG. 7, the highest blocked emitter when palletized product 702 enters the protective field is the emitter that produces beam 714. This highest interrupted beam is indicative of the product's height, and is therefore used by the light curtain controller to set the muting height for the current partial muting mode. The light curtain controller allows the debounce time to elapse between initial detection of the light curtain being interrupted (at time T2) and identification of the highest blocked emitter (at time T3) in order to allow for the possibility of slight downward tapering or other physical imperfections at the leading edge of the palletized product. Allowing a small debounce time to elapse ensures that the highest blocked emitter is identified at a time when the relatively flat top surface of the product is between the light curtain's emitter and receiver units. This debounce time can be set to a small duration to substantially minimize the time during which the light curtain is fully muted.

Based on the identification of the highest blocked emitter at time T3, the muting height configuration component 508 will set the muting height for partial muting mode. In some embodiments, the muting height configuration component 508 will allow for small variations in the height of the palletized product by adding a tolerance around the highest blocked emitter when setting the muting height. For example, if the highest blocked emitter is identified at time T3 as the Nth emitter from the bottom of the light curtain's emitter array, the muting height configuration component 508 may set the muting height by selecting the (N+X)th emitter from the bottom of the emitter array as the highest emitter that is to be muted during the current partial muting mode, where X is an integer number of additional emitters corresponding to a tolerance height. In the example of FIG. 7, the tolerance value X is equal to one emitter. Accordingly, since the emitter of beam 714 is the highest blocked emitter, the muting height configuration component 508 selects the emitter of beam 708—one emitter higher than the highest blocked beam—to be the highest muted beam for the current partial muting mode. It is to be appreciated, however, that any suitable tolerance can be added to the highest blocked beam to arrive at a suitable muting height.

Once the muting height configuration component 508 sets the muting height, all beams ranging from the lowest beam of the emitter array up to and including the highest muted beam selected by the muting height configuration component 508 will remain muted, and the muting control component 506 will un-mute all beams above the highest muted beam for the remainder of the duration during which the product is detected within the light curtain's protective field. At this time, the light curtain has entered partial muting mode, which remains active until the product has moved out of the light curtain's protective field.

Muting control component 506 maintains partial muting using the muting height set by the muting height configuration component until time T4, when the light curtain status component 504 indicates that the light curtain is clear. The light curtain status component 504 identifies the cleared status when all of the light curtain's beams become uninterrupted by obstructions and are detected by their corresponding receivers on the light curtain's receiver unit. This indicates that the palletized product has passed through the entryway and is now clear of the light curtain. Upon receiving the indication from the light curtain status component 504 that the light curtain is clear, the muting height configuration component 508 clears the previously set muting height so that a new muting height can be determined and set the next time a product enters the protective field during muting mode. When the light curtain is cleared, the light curtain transitions back to full muting mode, and awaits either the presence of the next object at the light curtain (which causes a new muting height to be determined and re-initiates partial muting mode based on the new muting height) or removal of the muting mode command. In this example, the muting control component 506 sets muting mode OFF at time T5 (e.g., in response to an indication from the industrial controller or from the light curtain controller's internal logic that the light curtain is to resume normal mode). During normal mode, blockage of any of the light curtain's beams will cause the light curtain to signal an unsafe state to the workcell's safety circuit.

During the partial muting phase of the sequence described above, the product will be allowed to pass through the muted beams corresponding to the muting height set by the muting height configuration component 508. During partial muting mode, the light curtain controller will monitor for two conditions, either of which will trigger an unsafe state output. First, if any of the un-muted beams higher than the highest set muted beam are blocked during this partial muting period, the light curtain controller's output component will signal an unsafe state to the workcell's safety circuit. This condition suggests that an extra object (e.g., a human operator) is riding on top of the product or walking along side of the product through the light curtain. As the second condition, the light curtain controller's output component will also signal the unsafe state to the workcell's safety circuit if any subset of the muted beams (short of all the beams) becomes un-blocked during partial muting. This condition suggests that the object passing through the light curtain is not the box-shaped product (or stack of products) expected by the system.

Figure 9:
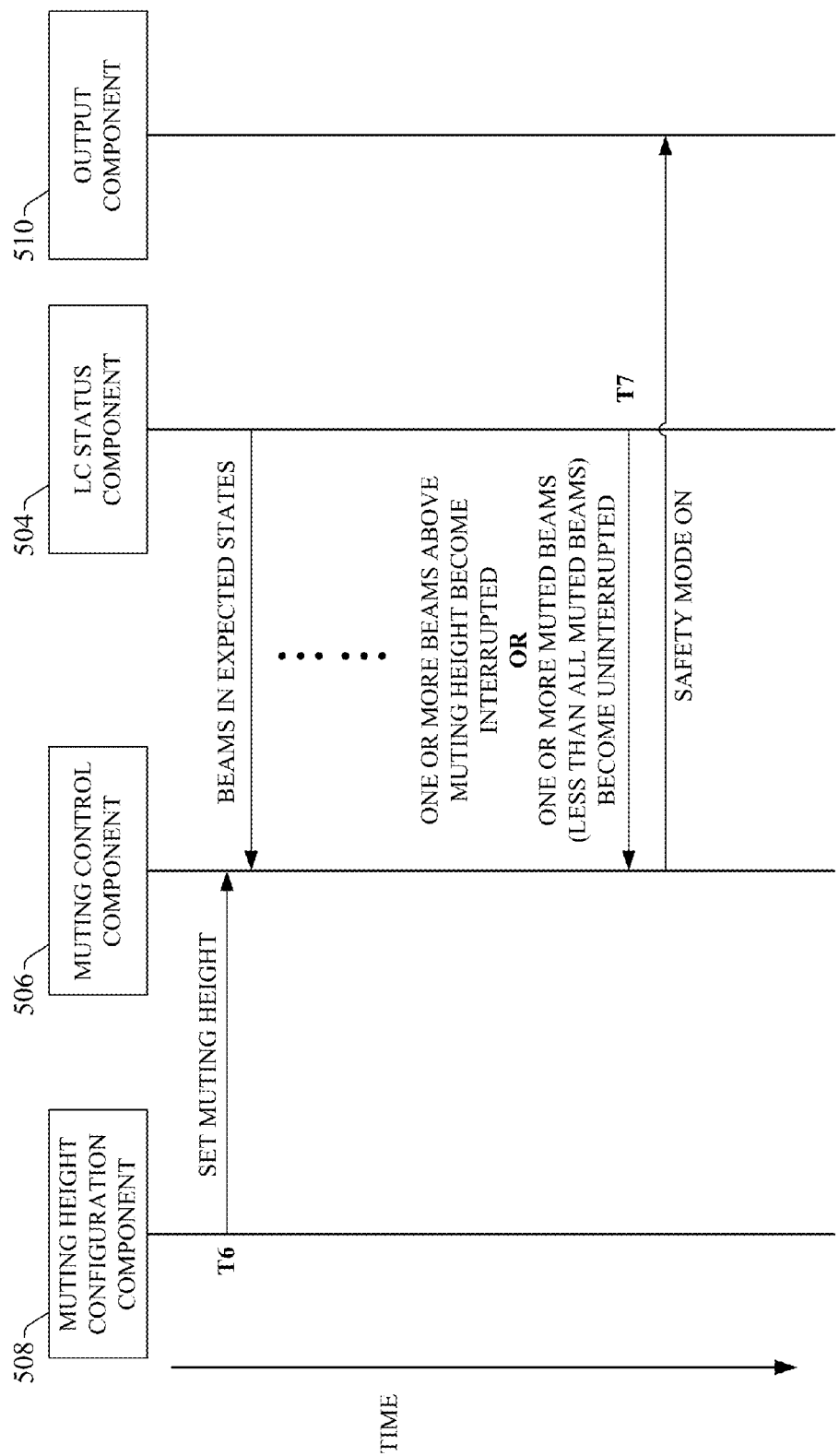
FIG. 9 is a timing chart illustrating an example sequence carried out by components of the light curtain controller when an un-muted beam is interrupted during a partial muting mode.

FIG. 9 is a timing chart illustrating conditions that trigger a safety mode during partial muting mode according to one or more embodiments. Prior to time T6 (not shown in FIG. 9) the muting control component 506 has initiated muting mode, causing the light curtain controller to enter full muting mode. Also prior to time T6, an object has entered the protective field of the light curtain. At time T6, the muting height configuration component 508 sets the muting height based on the highest interrupted beam detected shortly after the object has entered the protective field (e.g., after a short debounce time). Muting control component 506 then initiates partial muting based on the muting height, as described above.

Although the product is expected to have an overall box-like shape with a relatively consistent height (e.g., a box or stack of boxes with a flat top), it is recognized that small variations in the height of the product can cause the highest interrupted beam to change as the product traverses through the light curtain's protective field. Such variations may be caused, for example, by an uneven top surface of the product, or may be the result of a slight sloping or inclination of the product as it is conveyed through the light curtain. In order to allow for such small height variations, some embodiments of the muting height configuration component 508 can set the muting height to include a small tolerance. This can ensure that these small height variations do not cause an improper transition to safety mode.

Figure 10:
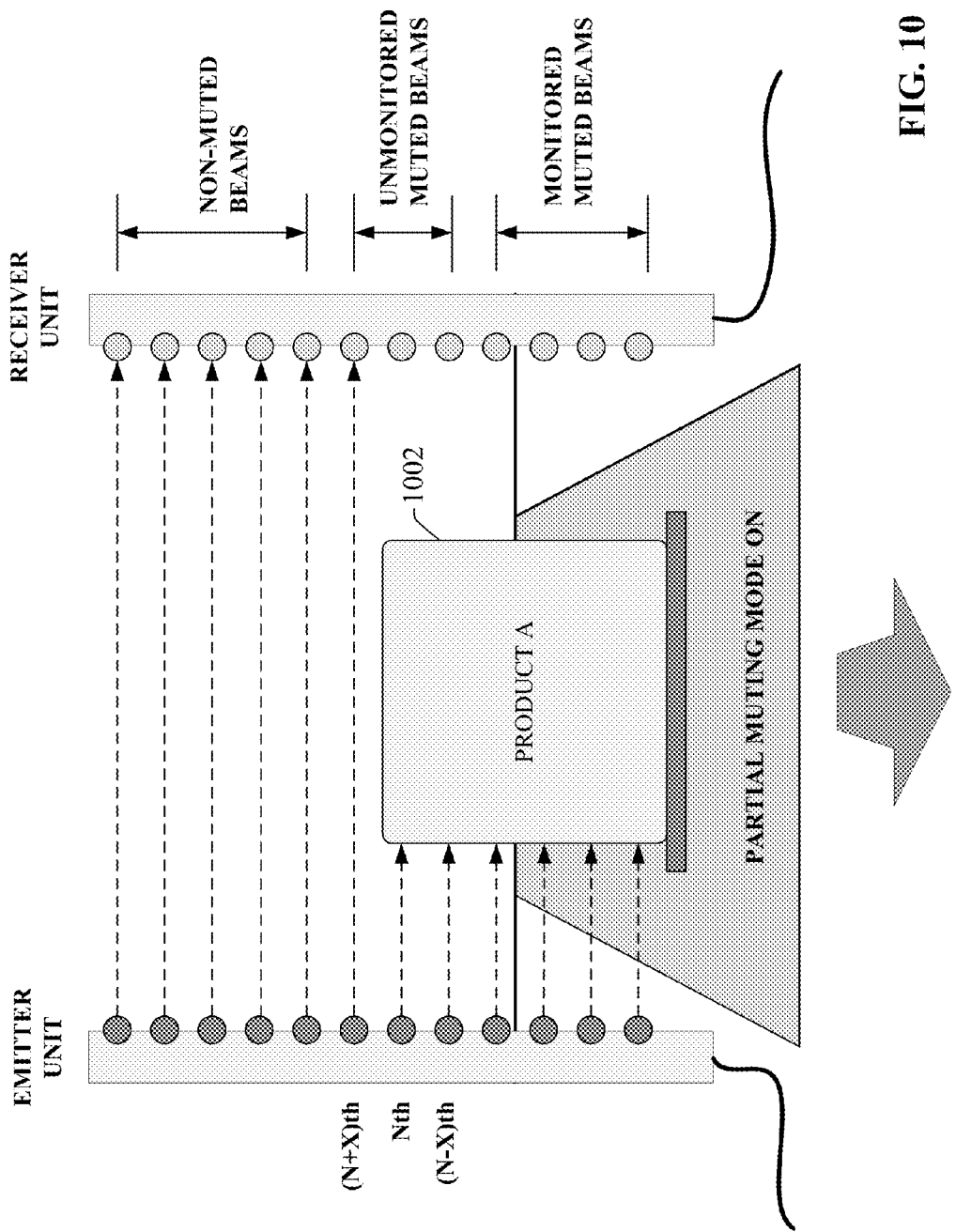
FIG. 10 is a front view of a light curtain indicating a range of non-muted beams, a range of unmonitored muted beams, and a range of monitored muted beams during a partial muting mode.

Turning briefly to FIG. 10, the determination and setting of a muting height tolerance is illustrated. In this example, when the front edge of product 1002 first enters the protective field, the Nth beam from the lower most beam is detected as the highest interrupted beam. The tolerance value is configured to be ±X beams, where X is an integer. In some embodiments, the light curtain controller allows the user to set the tolerance value X as desired. The value of X selected by the user may be a function of an expected amount of variation in the height of the products expected to pass through the light curtain (e.g., an amount of irregularity on the top surface of the products). For example, if the products comprise single boxes with relatively relatively smooth top surfaces, the user may configure a small tolerance value. Conversely, if the products comprise multiple small boxes that are stacked in multiple rows and columns, the tolerance may be set to a higher value to allow for the possibility of raised box corners along the top surface of the product bundle.

When the highest interrupted beam (the Nth beam from the lower most beam) is detected, a tolerance band is defined comprising the range of beams from the (N−X)th beam to the (N+X)th beam. In the example depicted in FIG. 10, the tolerance value X is set to one beam. Accordingly, the tolerance band comprises the Nth beam (the highest beam interrupted by the front edge of the product 1002), the beam immediately below the Nth beam, and the beam immediately above the Nth beam. As will be described in more detail below, this range of beams will be set as unmonitored muted beams during the partial muting mode. The beams below this range comprise monitored muted beams, while the beams above this range will comprise non-muted beams. The functions of these beams during partial muting mode are described in more detail below.

Returning now to FIG. 9, once the muting height is set at T6 (including setting of the monitored muting beams, the unmonitored muting beams, and the non-muted beams as described above in connection with FIG. 10), partial muting mode is initiated. At this time, the muting control component 506 begins monitoring which light curtain beams are currently interrupted and which are not interrupted (e.g., based on status information provided by the light curtain status component 504). As long as (1) the non-muted beams (those above the muting height) remain uninterrupted and (2) the monitored muting beams (those below the muting height) remain interrupted, the output component 510 indicates that the light curtain status is safe, and safety mode is not initiated. The band of unmonitored muted beams, corresponding to the tolerance range above and below the muting height, are allowed to fluctuate between interrupted and uninterrupted during the current partial muting cycle without causing the light curtain controller to report an unsafe state. As such, the unmonitored muted beams comprise a "don't care" range, whereby the light curtain controller disregards the states of the unmonitored muted beams when determining whether to initiate safe mode.

The muting control component 506 continues to monitor the beams in order to determine if one or both of the two unsafe conditions has occurred. The first unsafe condition—interruption of a non-muted beam above the set muting height—suggests that a second object (e.g., a human operator) is riding on top of the product, or walking along side of the product, as the product traverses through the protective field. The second unsafe condition—non-interruption of a monitored muted beam below the set muting height—suggests that the object passing through the light curtain is not the expected box shape, and therefore is not a valid product. At time T7, the muting control component 506 determines that one or both of these two unsafe conditions have occurred. In response to detecting this condition, muting control component 506 instructs output component 510 to initiate safety mode. In response to this instruction, the output component 510 switches the state of its output signal to indicate an unsafe state (e.g., by turning the output signal OFF). The state of the output signal is detected by the workcell's safety system, which isolates power from the hazardous machinery within the workcell, thereby placing the workcell in a safe state.

Some embodiments of the light curtain controller 502 can be configured to take the speed of the conveyor on which the products are being transported into account while configuring the muting height. For example, in some embodiments the debounce time between time T2 and T3 illustrated in FIG. 8 may be automatically configured by the light curtain controller based on the speed at which the product is passing through the light curtain. In such embodiments, the light curtain controller 502 can be configured to read a conveyor speed value from the industrial controller that controls the conveyor. This speed value can be mapped to the light curtain controller over a network, provided to the light curtain controller as a hardwired analog input from the industrial controller or motor drive that controls the speed of the conveyor, or through other means. The muting height configuration component 508 can then increase or decrease the debounce time (that is, the delay between detection of the light curtain being interrupted during muting mode and identification of the highest blocked beam) based on the speed. In general, the muting height configuration component 508 will decrease this debounce time as the conveyor speed increases, since the higher speed will cause the leading edge of the product to pass through the light curtain's protective field faster. For slower speeds, the muting height configuration component 508 can increase the debounce time to ensure that the determination of the highest blocked emitter is made at a time when the product's leading edge—which may be tapered and thus may not have a height characteristic of the product in general—has passed through the protective field.

The dynamic partial muting features of light curtain controller 502 are suitable for industrial applications in which relatively flat products (e.g. boxes, stacks of boxes, or box shaped products) are expected to pass through the light curtain. For flat products, deviations from the configured muting height are indicative of an improper object passing through the light curtain during muting mode. By dynamically setting the muting height for each product that passes through the light curtain's protective field based on an inferred height of the product, the light curtain controller provides a simple and flexible means for accommodating products of different heights while still preventing operators from entering the protected area while the workcell machinery is active. Moreover, since the light curtain controller infers the height of the product internally based on observations of interrupted beams, the system need not be pre-configured with different partial muting heights corresponding to different known products, nor is a separate product identification system necessary in order to trigger such pre-configured muting heights.

In some embodiments, the light curtain controller can also be configured to output information indicative of the measured height of the product passing through its protective field based on the highest interrupted beam detected by the light curtain. For example, once the highest interrupted beam is detected for an incoming product as described above, the light curtain can send height information for the product via an auxiliary output to a separate system. This information may be useful, for example, in product sorting or stacking applications that can leverage the height information of the incoming product in order to properly route, stack, or otherwise handle the incoming part based on its height.

Figure 11:
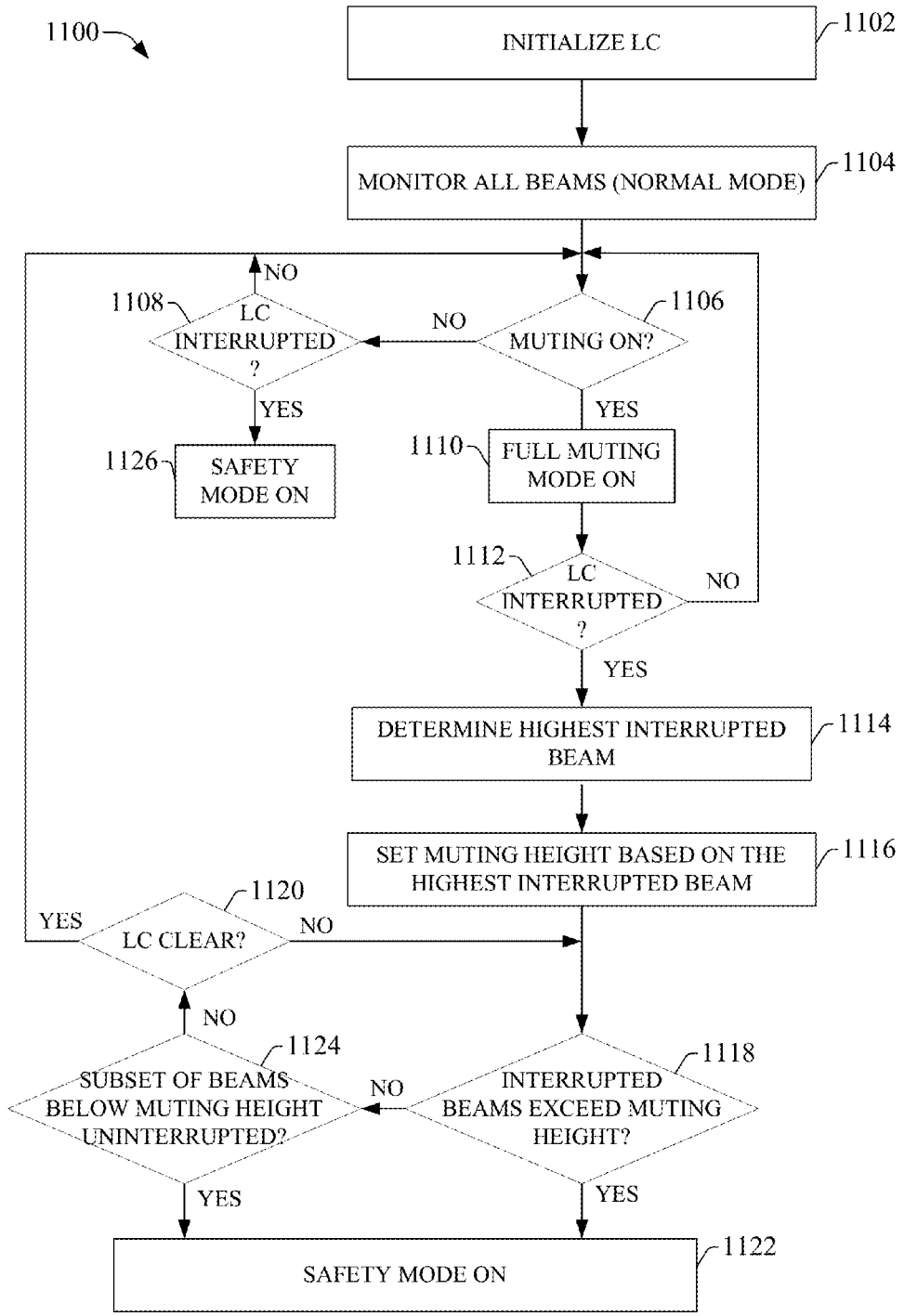
FIG. 11 is a flowchart of an example methodology for performing dynamic partial muting of a light curtain.

FIG. 11 illustrates a methodology in accordance with one or more embodiments of the subject application. While, for purposes of simplicity of explanation, the methodology is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies.

FIG. 11 illustrates an example methodology 1100 for performing dynamic partial muting of a light curtain. Methodology 1100 can be implemented, for example, by a light curtain controller that controls the monitoring, muting, and output functions of an industrial light curtain. Initially, at 1102, a light curtain (LC) is initialized. At 1104, all beams of the light curtain are initially monitored for safety purposes during normal mode of the light curtain. During this mode, interruption of any of the beams will cause the light curtain to indicate an unsafe state by changing a state of a safety output accordingly.

At 1106, a determination is made regarding whether the light curtain has been instructed to turn muting on. This instruction may be received, for example, from an industrial controller that performs supervisory control of a separate automation system (e.g., a conveyor system), or may be generated by the light curtain controller itself based on presence sensor inputs and internal muting logic. If muting has not been turned on (NO at step 1106), the methodology proceeds to step 1108, where a determination is made regarding whether any of the light curtain's beams are interrupted. If one or more light curtain beams are interrupted during normal mode (YES at step 1108), the light curtain initiates safety mode at step 1126. This can entail, for example, changing a state of a safety signal sent from the light curtain controller to a safety circuit (e.g., by switching the safety signal off), causing the safety circuit to isolate power from hazardous machinery that may otherwise cause injury to operators who breach the light curtain's protective field. Alternatively, if the light curtain is not interrupted (NO at step 1108), the methodology returns to step 1106 where the muting mode is confirmed.

If muting has been turned on (YES at step 1106), the light curtain transitions to full muting mode at step 1110, during which all of the light curtain's beams are muted. At step 1112, a determination is made regarding whether the light curtain's protective field has been interrupted (that is, whether one or more of the beams projected by the light curtain's emitters has been interrupted by an object passing between the light curtain's emitter and receiver units). If the light curtain's protective field has not been interrupted (NO at step 1112), the methodology returns to step 1106, where it is confirmed that muting mode is still on. The methodology will cycle between steps 1006 and 1112 until either muting is turned off (NO at step 1106 or until the light curtain's protective field is interrupted.

When the protective field is interrupted (YES at step 1112), the highest beam interrupted by the object is determined at step 1114. In some embodiments, the light curtain controller will make this determination after a defined debounce time has elapsed after initially detecting interruption of the light curtain at step 1112. At 1116, the muting height for the light curtain is set based on the highest interrupted beam determined at step 1114. In some embodiments, the light curtain will configure the muting to include a defined tolerance above or below the highest interrupted beam determined at step 1114. For example, if the highest interrupted emitter determined at step 1114 is the Nth emitter from the lowest position on the emitter array, the light curtain controller may define a muting height tolerance range by setting the (N+X)th beam from the lowest position as the highest muting height beam, and the (N−X)th beam from the lowest position as the lowest muting height beam, where X is an integer representing a height tolerance. The range between the (N−X)th beam and the (N+X)th beam (inclusive) comprises a "don't care" range of beams whose states will be ignored by the light curtain controller when determining whether to initiate safety mode during the upcoming partial muting mode. During the subsequent partial muting mode, beams above this range will be expected to remain uninterrupted, while beams below this range will be expected to remain interrupted. Accordingly, the muting height is set by keeping the beams from the lowest beam of the light curtain's emitter/receiver arrays up to and including (N−X)th emitter muted but monitored, while un-muting the subset of beams above the (N+X)th beam. The beams in the "don't care" range remain muted and are ignored by the controller for the purposes of determining when to initiate safety mode. The light curtain is now in partial muting mode.

At 1118, a determination is made regarding whether the interrupted beams exceed the muting height; that is, whether any of the un-muted beams above the (N+X)th beam are interrupted. If it is determined at step 1118 that any of the beams exceeding the muting height have been interrupted (YES at step 1118), the light curtain initiates safety mode at step 1122 (similar to the safety mode that is initiated at step 1126). Alternatively, if none of the beams exceeding the muting height are interrupted (NO at step 1118), the methodology moves to step 1124, where a determination is made regarding whether a subset of beams below the muting height (that is a subset of the beams below the (X-N)th beam) have become uninterrupted. In this regard, if one or more of the beams below the muting height become uninterrupted, the light curtain controller may wait a brief defined time period to determine whether all of the lower beams will become uninterrupted within the brief time period, which indicates that the box-shaped product has passed through the the light curtain However, if only a subset of these lower beams (less than all beams below the muting height) remain uninterrupted at the end of this brief time period—suggesting that the object that was initially detected is not a valid product—the methodology moves to step 1122 (YES at step 1124) and initiates safety mode.

Alternatively, if all the beams below the muting height remain interrupted (NO at step 1124), the methodology moves to step 1120, where a determination is made regarding whether all beams (as opposed to merely a subset of the beams) are clear, indicating that the object has passed through or otherwise been removed from the light curtain's protective field. If the light curtain is not clear (NO at step 1120) the methodology returns to step 1118, where the beams continue to be checked in accordance with partial muting mode. The methodology cycles between steps 1118, 1124, and 1120 until either of the two conditions represented by steps 1118 and 1124 become true (causing safety mode to be turned on at step 1120) or until the light curtain's beams are clear (YES at step 1120), causing the methodology to return to step 1106. If muting mode is still on at step 1106 after the product has passed clear of the light curtain, the system will transition from partial muting mode back to full muting mode at step 1110, and await either arrival of another product at step 1112, or removal of the muting command at step 1106, at which time the system will inquire as to whether the light curtain is interrupted at step 1108.

Although methodology 1100 depicts the system returning to step 1106 after the product has passed through the light curtain, in some embodiments the system may instead return to normal mode (rather than full muting mode) after the product has passed through the light curtain, thereby reducing the risk of an operator passing through the light curtain during the full muting mode by closely following behind the product. In such embodiments, the light curtain controller can be user-configurable to allow the user to set whether the system will return to full muting mode or normal mode after each product has passed through the light curtain.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 12:
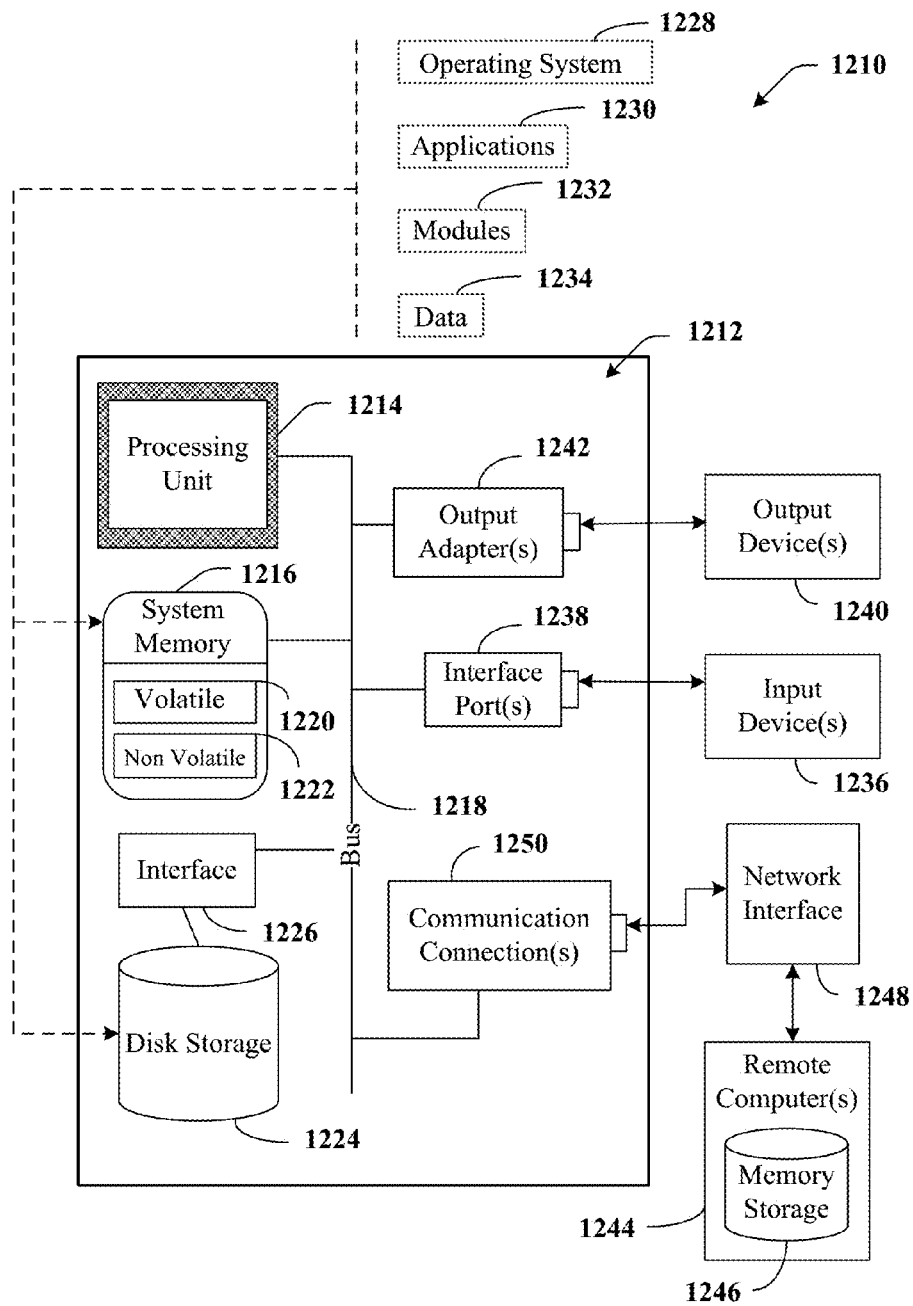
FIG. 12 is an example computing environment.
Figure 13:
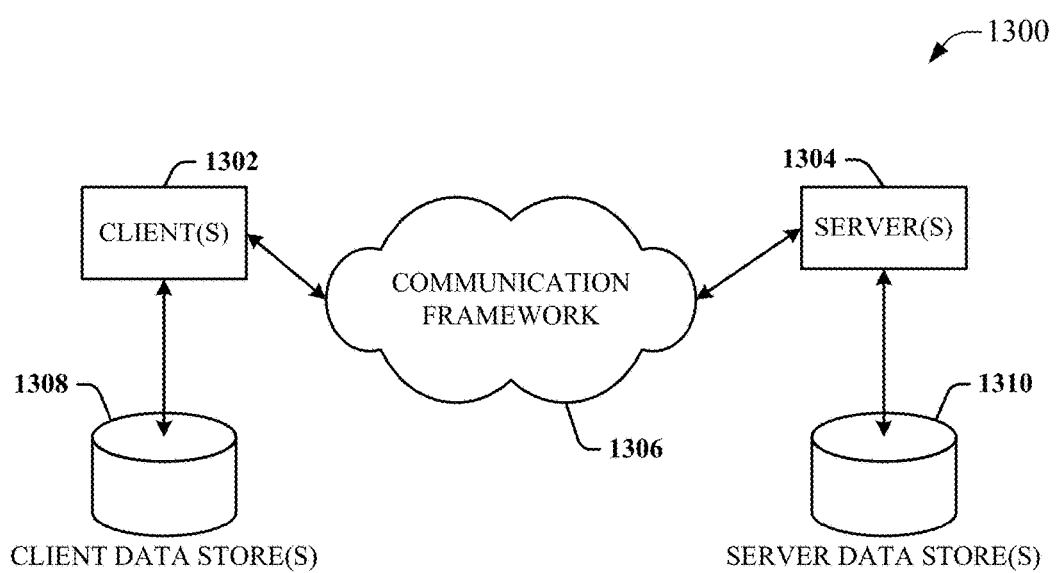
FIG. 13 is an example networking environment.

In order to provide a context for the various aspects of the disclosed subject matter, FIGS. 12 and 13 as well as the following discussion are intended to provide a brief, general description of a suitable environment in which the various aspects of the disclosed subject matter may be implemented.

With reference to FIG. 12, an example environment 1210 for implementing various aspects of the aforementioned subject matter includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Multi-core microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable PROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer 1212. System applications 1230 take advantage of the management of resources by operating system 1228 through program modules 1232 and program data 1234 stored either in system memory 1216 or on disk storage 1224. It is to be appreciated that one or more embodiments of the subject disclosure can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapters 1242 are provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the system bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

FIG. 13 is a schematic block diagram of a sample computing environment 1300 with which the disclosed subject matter can interact. The sample computing environment 1300 includes one or more client(s) 1302. The client(s) 1302 can be hardware and/or software (e.g., threads, processes, computing devices). The sample computing environment 1300 also includes one or more server(s) 1304. The server(s) 1304 can also be hardware and/or software (e.g., threads, processes, computing devices). The servers 1304 can house threads to perform transformations by employing one or more embodiments as described herein, for example. One possible communication between a client 1302 and servers 1304 can be in the form of a data packet adapted to be transmitted between two or more computer processes. The sample computing environment 1300 includes a communication framework 1306 that can be employed to facilitate communications between the client(s) 1302 and the server(s) 1304. The client(s) 1302 are operably connected to one or more client data store(s) 1308 that can be employed to store information local to the client(s) 1302. Similarly, the server(s) 1304 are operably connected to one or more server data store(s) 1310 that can be employed to store information local to the servers 1304.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A light curtain control system, comprising:
a memory that stores executable components; and
a processor, operatively coupled to the memory, that executes the executable components, the executable components comprising:
a light curtain status component configure to generate status information for a light curtain based on a determination of whether one or more light beams, of a set of light beams emitted by a set of emitters of the light curtain, are detected by corresponding one or more receivers of the light curtain;
a muting control component configured to control a full muting mode and a partial muting mode for the light curtain; and
a muting height configuration component configured to, in response to an elapse of a defined time duration subsequent to detecting interruption of one or more of the set of light beams during the full muting mode, set a muting height for the partial muting mode based on identification of a highest light beam, of the set of light beams, that is interrupted and initiate the partial muting mode.

2. The light curtain control system of claim 1, wherein the muting control component is further configured to
mute, for the partial muting mode, a subset of the light beams ranging from a lowest light beam of the light curtain to a light beam corresponding to the muting height, wherein the subset of the light beams comprise muted light beams, and
un-mute, for the partial muting mode, a remainder of the set of light beams, wherein the remainder of the set of light beams comprise un-muted light beams.

3. The light curtain control system of claim 2, wherein the highest light beam is an Nth light beam from a lower-most light beam of the set of light beams, and the muting control component is configured to set the light beam corresponding to the muting height to be an (N+X)th light beam from the lower-most light beam, where N and X are integers.

4. The light curtain control system of claim 2, wherein the executable components further comprise an output component configured to control a state of a safety output based on statuses of the set of light beams, and wherein during the partial muting mode the output component is configured to:
set the safety output to indicate a safe state in response to determining that only the muted light beams are interrupted, and
set the safety output to indicate an unsafe state in response to determining that any of the unmated light beams are interrupted.

5. The light curtain control system of claim 1, wherein the muting height configuration component is further configured to clear the muting height in response to a determination that all of the set of light beams have become uninterrupted.

6. The light curtain control system of claim 1, further comprising an auxiliary output configured to generate and output height data determined based on the identification of the highest light beam.

7. The light curtain control system of claim 1, wherein the muting height configuration component is further configured to read a conveyor speed value from an industrial controller, and set the defined time duration as a function of a conveyor speed.

8. The light curtain control system of claim 1, wherein the muting control component is configured to initiate the partial muting mode in response to at least one of an instruction received from an industrial controller or one or more states of one or more sensors communicatively connected to the light curtain control system.

9. A method for partially muting a light curtain, comprising:
initiating, by a system comprising a processor, a full muting mode for a light curtain, wherein the full muting mode causes all light beams of the light curtain to become muted;
determining, by the system, that at least one of the light beams has been interrupted during the full muting mode;
in response elapse of a defined time period subsequent to the determining, identifying, by the system, a highest interrupted light beam of the light beams; and initiating, by the system in response to the identifying, a partial muting mode for the light curtain, wherein the initiating the partial muting mode comprises setting a muting height for the partial muting mode based on the highest interrupted light beam.

10. The method of claim 9, wherein the initiating the partial muting mode further comprises:
leaving a first subset of the light beams corresponding to the muting height muted, and
un-muting a second subset of the light beams that are above the muting height.

11. The method of claim 10, wherein the highest interrupted light beam is an Nth beam from a lower-most light beam of the light curtain, and the initiating the partial muting mode further comprises:
setting the first subset of the light beams to comprise the lower-most light beam, an (N−X)th light beam from the lower-most light beam, and all intermediate light beams between the lower-most light beam and the (N−X)th light beam, where N and X are integers; and
un-muting the second subset of the light beams comprising an upper-most light beam, an (N+X)th light beam from the lower-most light beam, and all intermediate light beams between the upper-most light beam and the (N+X)th light beam.

12. The method of claim 10, further comprising:
setting, by the system, an output signal to indicate a safe state in response to determining that the first subset of the light beams are interrupted and the second subset of the light beams are uninterrupted during the partial muting mode; and
setting, by the system, the output signal to indicate an unsafe state in response to determining than any of the second subset of the light beams are interrupted during the partial muting mode or one or more of the first subset of the light beams less than a total number of the first subset are not interrupted during the partial muting mode.

13. The method of claim 9, further comprising resetting, by the system, the muting height in response to a determination that all of the light beams have become uninterrupted.

14. The method of claim 9, further comprising setting, by the system, the defined time period as a function of a measured conveyor speed.

15. The method of claim 9, wherein the initiating the muting mode comprises initiating the muting mode in response to at least one of receiving a muting instruction from an industrial controller or determining a muting condition based on one or more states of respective one or more sensors.

16. A non-transitory computer-readable medium having stored thereon instructions that, in response to execution, cause a system comprising a processor to perform operations, the operations comprising:
detecting that a light curtain has initiated a muting mode;
muting all light beams of the light curtain in response to the detecting;
determining that at least one of the light beams has been interrupted during the muting mode;
in response to determining that a defined debounce time has elapsed subsequent to the determining, identifying a highest interrupted light beam of the light beams;
initiating a partial muting mode in response to identifying the highest interrupted light beam; and
setting a muting height for the partial muting mode based on the highest interrupted light beam.

17. The non-transitory computer-readable medium of claim 16, wherein the setting the muting height comprises:
leaving a first subset of the light beams corresponding to the muting height muted, and
un-muting a second subset of the light beams that are higher than the muting height.

18. The non-transitory computer-readable medium of claim 17, wherein the highest interrupted light beam is an Nth beam from a lowest light beam of the light curtain, and the setting the muting height further comprises:
setting the first subset of the light beams to comprise the lowest light beam, an (N−X)th light beam from the lowest light beam, and all intermediate light beams between the lower-most light beam and the (N−X)th light beam, where N and X are integers; and
settting the second subset of the light beams to comprise a highest beam of the light curtain, an (N+X)th light beam from the lowest light beam, and all intermediate light beams between the (N+X)th light beam and the highest light beam.

19. The non-transitory computer-readable medium of claim 17, further comprising:
setting an output signal to indicate a safe state in response to determining that the first subset of the light beams are interrupted and the second subset of the light beams are uninterrupted during the partial muting mode; and
setting the output signal to indicate an unsafe state in response to determining that any of the second subset of the light beams are interrupted during the partial muting mode or that one or more of the first subset of the light beams less than a total number of the first subset become uninterrupted during the partial muting mode.

20. The non-transitory computer-readable medium of claim 16, further comprising clearing the muting height and reverting to at least one of a full muting mode or a normal operating mode in response to a determination that all of the light beams have become uninterrupted.

* * * * *